US006733019B2

(12) United States Patent
Diener et al.

(10) Patent No.: US 6,733,019 B2
(45) Date of Patent: May 11, 2004

(54) TWO-JOINT ARRANGEMENT

(75) Inventors: André Diener, Osnabrück (DE); Reinhard Buhl, Bohmte (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 41 days.

(21) Appl. No.: 10/146,766

(22) Filed: May 16, 2002

(65) Prior Publication Data

US 2003/0214110 A1 Nov. 20, 2003

(51) Int. Cl.$^7$ ................................................. B62D 7/20
(52) U.S. Cl. ............................ 280/93.51; 280/93.511; 280/93.512
(58) Field of Search ..................... 280/93.51, 93.511, 280/93.512

(56) References Cited

U.S. PATENT DOCUMENTS

| | | | | |
|---|---|---|---|---|
| 2,049,502 A | * | 8/1936 | Hufferd et al. | ............. 403/138 |
| 6,007,079 A | * | 12/1999 | Kincaid et al. | ........ 280/93.511 |
| 2003/0137120 A1 | * | 7/2003 | Thompson et al. | .... 280/93.511 |

* cited by examiner

Primary Examiner—J. Woodrow Eldred
(74) Attorney, Agent, or Firm—McGlew and Tuttle, P.C.

(57) ABSTRACT

A two-joint arrangement is presented for the articulated connection of guide elements, preferably of a motor vehicle linkage with a common articulated part. Each of the two joints has a joint housing that is connected to a guide element each and a bearing shell that is accommodated within the joint housing, in which a pivot part which is rigidly connected to the common articulated part is accommodated in a rotatable and pivotable manner. In a first embodiment variant, a pivot part (26) of a joint (4) has an opening (24) running in the pivot part longitudinal axis, which the pivot part (17) of the other joint (5) having a screw bolt area (23) located thereon penetrates whereby a clamping nut is arranged on the free end of the screw bolt area (23) facing away from the pivot part (17) of the other joint (5). Another solution variant provides that both pivot parts (26) of each joint (4, 5) have each an opening (24) running in the pivot part longitudinal axis, which a screw bolt (31) provided with a widened head area penetrates jointly, which, on its free end facing away from the head area (32), has a detachable clamping nut (29) connected thereto. The solution variants disclosed offer the advantage that the individual joints of the two-joint arrangement can be mounted in a simple manner and can be separately replaced.

23 Claims, 6 Drawing Sheets

TWO-JOINT ARRANGEMENT

FIELD OF THE INVENTION

The present invention pertains to a two-joint arrangement for the articulated connection of guide elements, preferably of a motor vehicle steering linkage with a common articulated part.

BACKGROUND OF THE INVENTION

Such two-joint arrangements have become known, e.g., in the steering linkages for motor vehicles. The guide elements in this case are, on the one hand, the steering rod connected to a steering gear, and, on the other hand, the steering tie rod that is used for connecting two pivotable wheel carriers. The steering tie rod and the steering rod are each fastened to one of the wheel carriers to be pivoted synchronously in an articulated part designated as a drag bearing via a ball-and-socket joint. Such two-joint arrangements are very compact, but often form an inseparable connection of the joints, so that in case of the wear of one joint, the entire two-joint arrangement must be replaced.

In order to remedy this drawback, a joint connection with two ball-and-socket joints is disclosed in DE 40 11 179 A1, for example, from the state of the art, in which, to obtain a separable embodiment requiring little space for components, the joint arrangement is designed such that the first joint with a joint pivot is inserted into a continuous recess of the articulated part, whereby the joint pivot has a threaded section. A joint part of the second joint having a corresponding threaded section is then screw-connected to the joint pivot from the opposite direction, so that a rigid connection is brought about between the joint pivot of both joints and the articulated part arranged in the middle between these joints. A drawback of this other design known from the state of the art that must be stressed is especially the special shape of the joint pivot, which is related to a not inconsiderable production cost and thus must be considered to be cost-intensive.

SUMMARY OF THE INVENTION

The object of the present invention is to provide a two-joint arrangement of the generic type, which requires less work in terms of its production cost, can be easily mounted, and has an advantageous design in terms of the power flow within the two-joint arrangement. The objects are accomplished, in conjunction with the characterizing part of claims 1 and 5, by the technical teaching disclosed in these subordinate claims.

First of all, each of the two-joints of the two-joint arrangement has a joint housing each connected to a guide element and a bearing shell accommodated within the joint housing, in which a pivot part which is rigidly connected to the common articulated part is accommodated in a rotatable and pivotable manner.

According to the present invention, one pivot part of a joint is designed such that it has an opening running in the longitudinal axis of the pivot part, through which the pivot part of the other second joint penetrates with a screw bolt located on it, whereby a clamping nut is arranged on the free end opposite the pivot part of the other joint. The pivot part of the other joint is, as is already known from the state of the art, guided through an opening of the articulated part of the axle carrier arranged in the middle between the two joints. A ball sleeve joint, which is available from the state of the art, may be used for that joint of the two-joint arrangement, in whose pivot part an opening is provided. Thus, for the two-joint arrangement containing special components, it is now only necessary to produce the specially designed pivot part of the other second joint. The mounting of the two-joint arrangement is extremely simple by means of simply putting together the joints used with the guide elements arranged thereon in the form of a steering rod and a steering tie rod, as well as the securing in position by means of a commercially available nut, such that another cost savings compared to the solutions known from the state of the art can be brought about.

It has proven to be especially advantageous if the pivot part of the other joint has an intermediate area of a cone-shaped design between the bearing area contained in the bearing shell and the screw bolt, which is contained in a corresponding, cone-shaped opening of the articulated part.

By means of the said cone connection between the pivot part and the articulated part, a highly rigid connection of both components can be brought about, whereby the rigidity primarily depends on the starting torque of the clamping nut placed on the screw bolt of the pivot part.

In addition, according to an advantageous improvement, the pivot part of the other joint has a tool mount for blocking the rotary movement of the pivot part about its longitudinal axis on its free end facing towards the bearing area. In this case, the tool mount may be designed as a screw slot recess or as a hexagon socket. By means of the measure described, a simple holding up for the tightening moment of the clamping nut is especially possible when screwing the components together.

The other way to accomplish the object according to the present invention provides for the two-joint arrangement for the articulated connection of guide elements, preferably of a motor vehicle steering linkage with a common articulated part, that both pivot parts of each joint have each an opening running in the longitudinal axis of the said pivot part, through which a screw bolt provided with a widened head area penetrates jointly, which screw bolt has, on its free end opposite the head area, a clamping nut detachably connected thereto.

Similar to the above-described solution variant 1, a ball sleeve joint known from the state of the art may be used for the ball-and-socket joints belonging to the two-joint arrangement, in the pivot parts of which are provided openings. Such joints are commercially available in different designs. For the embodiment of the two-joint arrangement according to the present invention, according to the second solution variant, only the special production of the screw bolt connecting the two ball-and-socket joints and the articulated part is necessary. This screw bolt has a simple design and thus is produced in a cost-favorable manner. The mounting of the two-joint arrangement according to the second solution variant can likewise be carried out in a simple manner, as was already explained in the description of the first solution example, by putting the components used, together, and screwing them together.

It may be especially advantageous that the screw bolt has, in the area of the pivot part openings, a thread-free partial area which has a slightly smaller external diameter than the respective pivot part openings. By means of this measure a sliding bearing is created between the pivot part of each ball-and-socket joint and the screw bolt, which has mounting-related advantages.

The openings in each pivot part of the ball-and-socket joints used are designed as through holes.

In addition, it has proven to be advantageous that the screw bolt has a cone-shaped design between the bolt areas contained in the openings of the pivot parts, whereby the cone-shaped intermediate area is contained in a corresponding, cone-shaped recess of the articulated part. By means of this measure, the screw bolt is secured in position without problems within the articulated part arranged in the middle between the ball-and-socket joints during the mounting, but may, during repairs, again be removed for replacing the ball-and-socket joints. Moreover, both possibilities for accomplishing the object described offer the guarantee that, in case of the wear of one of the two ball-and-socket joints used, the same may be replaced without the still intact, other ball-and-socket joint having to be additionally replaced as well.

In another advantageous embodiment of the present invention in accordance with claim 5, it may be expedient to pass the screw bolt through a cylindrical hole of the articulated part. A cavity designed in diameter as being larger than the actual hole, with which the pivot part of each ball-and-socket joint meshes after putting together the two-joint arrangement, may be arranged on both openings of the through hole. By means of this technical measure, a lateral shifting of the ball-and-socket joints onto the articulated part is prevented. A lateral shifting of the ball-and-socket joints may also be brought about by a bonding of the pivot parts on the corresponding surface of the said articulated part, whereby, within the framework of the structural design, the above-mentioned cavities in the articulated part may be omitted.

The two solution variants are described below in detail each based on an embodiment according to the present invention with reference to the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
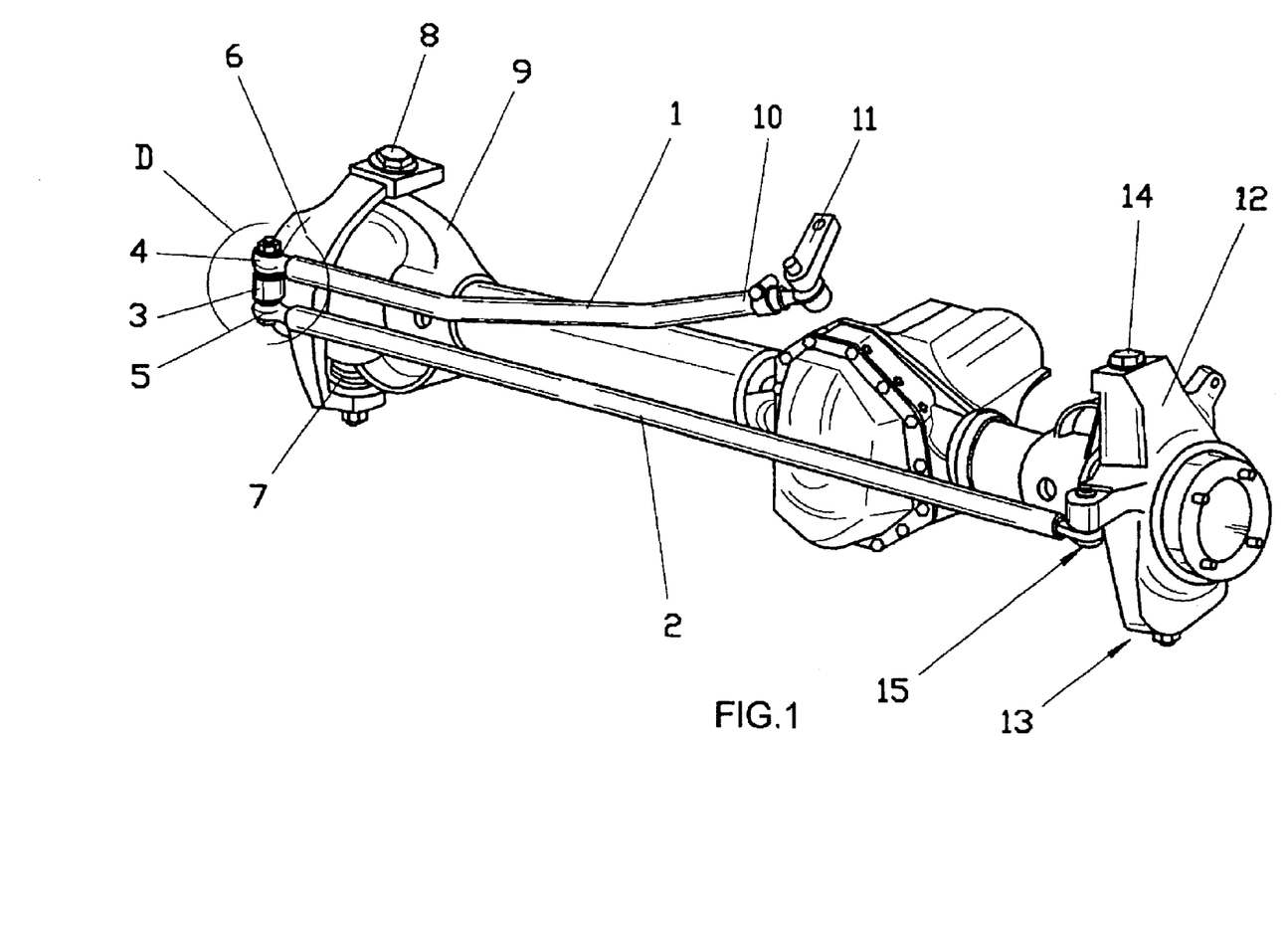
FIG. 1 is a perspective view showing the two-joint arrangement according to the present invention as a component of a steering linkage of a motor vehicle.

Referring to the drawings in particular, the steering linkage of a motor vehicle shown in FIG. 1 together with a front axle arrangement consists essentially of a steering rod 1 and a steering tie rod 2. The steering rod 1 and the steering tie rod 2 are secured together in position at an articulated part 3 by means of a ball-and-socket joint 4 and 5, respectively. The articulated part 3 is, in turn, the component of a wheel carrier 6, which is rotatably mounted on an axle body 9 by means of a supporting joint 7 and a guide joint 8. The free end 10 of the steering rod 1 opposite the ball-and-socket joint 4 is, in this exemplary embodiment, connected via a so-called Pitman arm 11, e.g., to a steering gear not shown in detail here for reasons of clarity. The steering tie rod 2, which is likewise connected to the articulated part 3 via the ball-and-socket joint 5, is used to transfer the steering forces acting from the steering rod 1 on the wheel carrier 6 to the other wheel carrier 12 belonging to the front axle on the opposite free end of the axle body. The wheel carrier 12 is, analogously to the articulated fastening of the wheel carrier, likewise accommodated in a supporting joint 13 and a guide joint 8, as a result of which a rotary movement analogous to that of the wheel carrier in relation to the axle body 9 is made possible. The steering tie rod 2 is connected to the wheel carrier 12 by means of a usual ball-and-socket joint 15.

The steering rod 1 and steering tie rod 2 are generally designated as guide elements of the two-joint arrangement according to the present invention, which is emphasized in FIG. 1 with the reference D in their entirety by the circular view.

The two-joint arrangement shown in FIG. 1 may be produced by two different solution variants according to the present invention.

Figure 2:
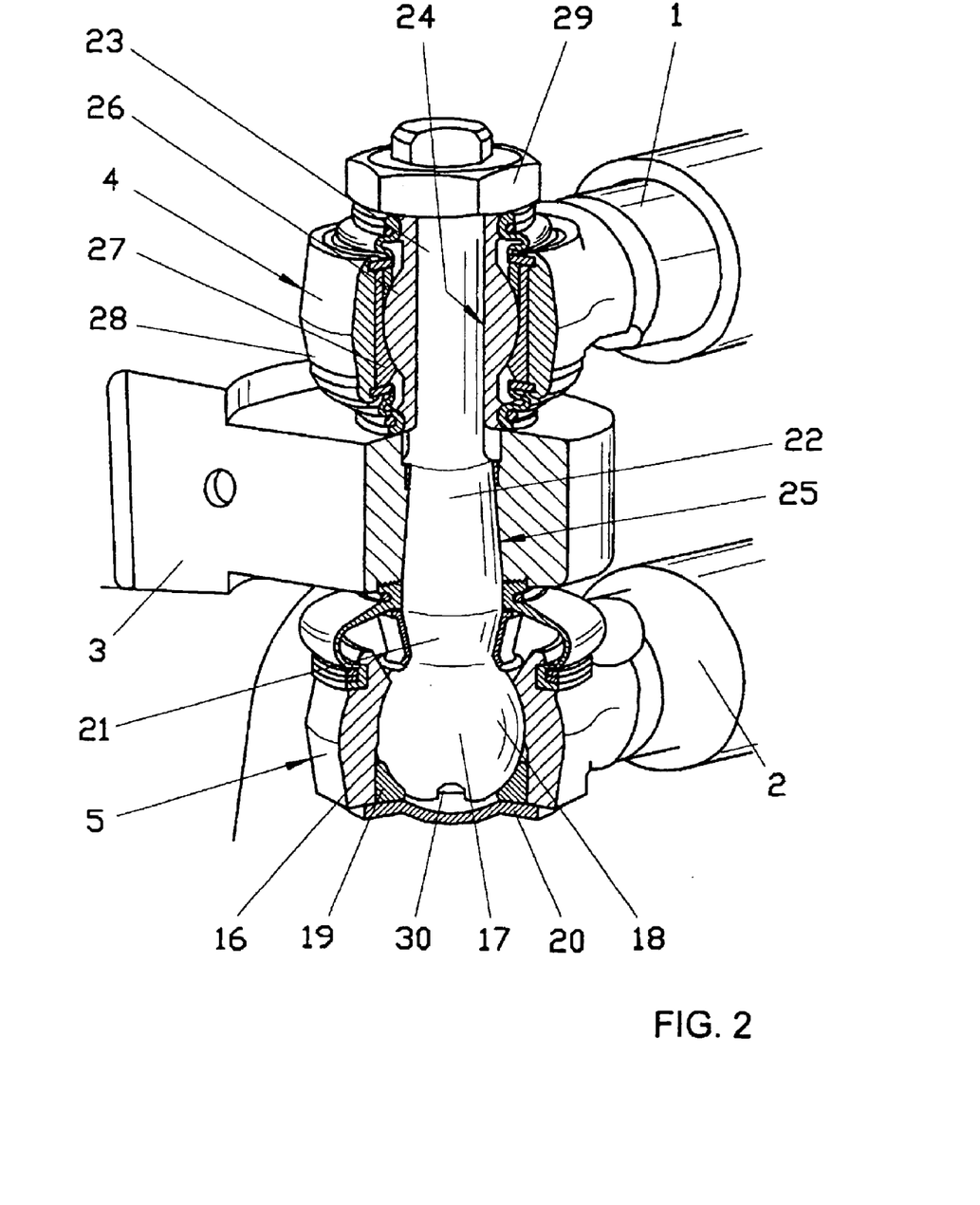
FIG. 2 is a perspective partially sectional view through the two-joint arrangement corresponding to the first solution variant.

A first solution variant is shown in detail in FIG. 2.

The articulated part 3 and the ends of the steering rod provided with the ball-and-socket joints 4 and 5, as well as the steering tic rod 2 are again apparent from this figure. Due to the insertion of the ball-and-socket joints 4 and 5 between the steering rod 1 or steering tie rod 2 and the articulated part 3 a rotatable and pivotable connection between the components is possible.

In detail, the two-joint arrangement is structurally designed so that a pivot part 17 is accommodated in a joint housing 16 of the ball-and-socket joint 5. In this case, the joint housing 16 is designed as being in one piece with the steering tie rod 2. On its first free end placed within the ball-and-socket joint 5, the pivot part 17 consists of a cone-shaped bearing area 18, which is supported by a bearing shell 19 located within the joint housing 16 and held by a sealing cover 20.

Conically running areas 21 and 22, viewed in diameter, viewed in the axial longitudinal direction of the pivot part 17, as well as a screw bolt area 23 provided with a screw thread are connected to the bearing area 18 of the pivot part 17.

The conical area 22 of the pivot part 17 is accommodated in a corresponding cone-shaped recess 25 of the articulated part 3, whereas the screw bolt area 23 is passed through by a said opening 24 of a pivot part 26 arranged within the ball-and-socket joint 4, which opening is designed as a hole. The said pivot part 26 is in turn mounted rotatably and pivotably in a bearing shell 27, which is secured in position in a joint housing 28 of the ball-and-socket joint 4. In this case the joint housing 28 is an integral component of the steering rod 1.

As is apparent from FIG. 2 the screw bolt area 23 protrudes above the ball-and-socket joint 4 with its free end facing away from the bearing area 18. A clamping nut 29 is screwed onto this free end. For the mounting of the two-joint arrangement consisting of the two ball-and-socket joints 4 and 5 and the articulated part 3, first the pivot part 17 of the ball-and-socket joint 5 is inserted through the cone-shaped recess 25 of the articulated part 3. The steering rod 1 with the ball-and-socket joint 4 located thereon and designed as a ball sleeve joint is then put in place. In conclusion, the clamping nut 29 is placed onto the free end of the screw bolt area and screwed up to the housing stop side of the ball-and-socket joint 4. In order to prevent a rotation of the pivot part 17 in this procedure, it is provided, on its free end of the bearing area 18, with a too mount designed as a screw slot recess 30, in which a screwdriver can be used.

If the clamping nut 29 rests on the upper housing side of the ball-and-socket joint 4, another rotation of the clamping nut 29 in the tightening direction leads to a pulling in of the cone-shaped area 22 of the pivot part 17 into the cone-shaped recess 25 of the articulated part 3, so that a rigid connection is produced between the articulated part 3 and the pivot part 17. At the same time, the pressing forces between the housing sides of the ball-and-socket joints 4 and 5 are increased both on the clamping nut 29 and on the articulated part 3, so that a rigid connection free from play of the entire two-joint arrangement is brought about. After the mounting is finished, only the rotatability or pivotability of the steering rod 1 and the steering tie rod 2 against the articulated part 3 as is determined within the framework of the degrees of freedom of the ball-and-socket joints is given.

Figure 3:
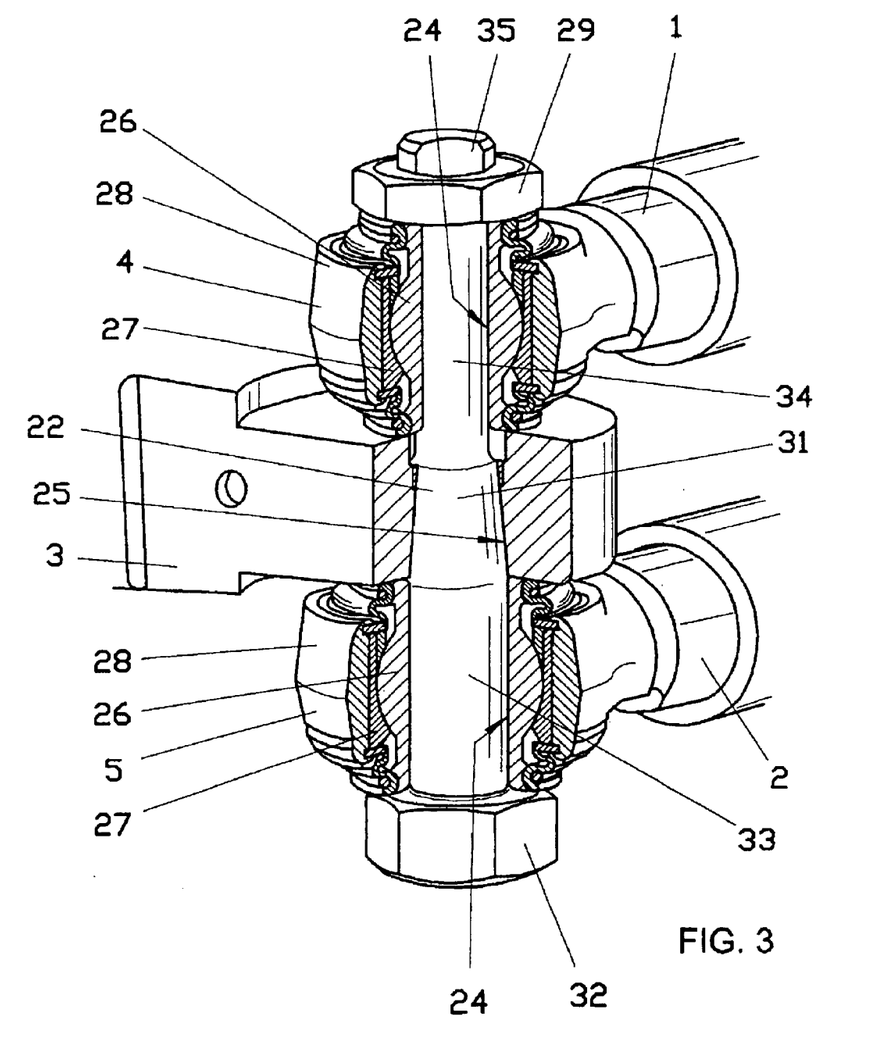
FIG. 3 is a perspective partially sectional view through the two-joint arrangement corresponding to the second solution variant.

As an alternative to the solution variant which is shown in detail in FIG. 2, another possibility for accomplishing the object consists of structurally designing a two-joint arrangement of the generic type according to the view of FIG. 3.

Considerable differences between the two possibilities for accomplishing the object can be seen in that, in the variant of FIG. 3, both the ball-and-socket joint 4 and the ball-and-socket joint 5 have, in their structural shape, an identical design as ball sleeve joints. Another type of fastening between the steering rod 1, the articulated part 3 and the steering tie rod 2 is inevitably produced by the use of two ball sleeve joints.

In the description of FIG. 3, in all cases, in which components identical to the solution variant 1 of FIG. 2 are present, the already established reference numbers are used below.

Insofar as both the ball-and-socket joint 4 and the ball-and-socket joint 5, within the framework of their design as ball sleeve joints, consist of a pivot part 26 with a central, cylindrical opening 24 that is designed as a hole, whereby the respective pivot part 26 is accommodated in a bearing shell 27 in a rotatable and pivotable manner. The bearing shell 27 is in turn accommodated in the joint housing 28, which is an integral component of the steering rod 1 and the steering tie rod 2, respectively.

The single difference between the ball-and-socket joints 4 and 5 lies in the fact that the diameter of the opening 24 within the pivot part 26 in the ball-and-socket joint 4 is smaller than in the ball-and-socket joint 5. The use of two ball sleeve joints makes it necessary to make the connection between the fundamental components steering rod 1 at the articulated part 3 and steering tie rod 2 by means of a screw bolt 31. Viewed in the axial longitudinal direction, the screw bolt 31 consists of a head area 32, which on its end side is designed as a hexagon, to which is connected a cylindrical area 33 arranged within the opening 24 of the said ball-and-socket joint 5. A cone-shaped area 22, which is accommodated in a corresponding cone-shaped recess 25 of the articulated part 3 in analogy to the view shown in FIG. 2, is in turn connected to this area 33. Another cylindrical area 34, which is accommodated in the opening 24 of the pivot part 26 of the said ball-and-socket joint 4, is in turn connected to the conical area 22. At its free end, which projects upwards from the opening 24 of the ball-and-socket joint 4, this cylindrical area 34 is provided with a threaded area 35. A clamping nut 29 is screwed onto the threaded area 35.

Similar to that solution variant of FIG. 2, the mounting of the entire two-joint arrangement takes place by inserting the screw bolt 31 through the corresponding openings 24 and the recess 25 of the articulated part and the ball-and-socketjoints 4 and 5 and by tightening the components in question against one another by means of the clamping nut 29. The screw bolt is tightened by means of its conical area 22 within the cone-shaped recess 25 of the articulated part 3, such that only a relative movement between the components involved corresponding to the degrees of freedom provided by the ball-and-socket joints 4 and 5 is possible.

One special advantage of the last-discussed embodiment variant 2 is that both the steering tie rod 2 and the steering rod 1 can be completely prefabricated.

Figure 4:
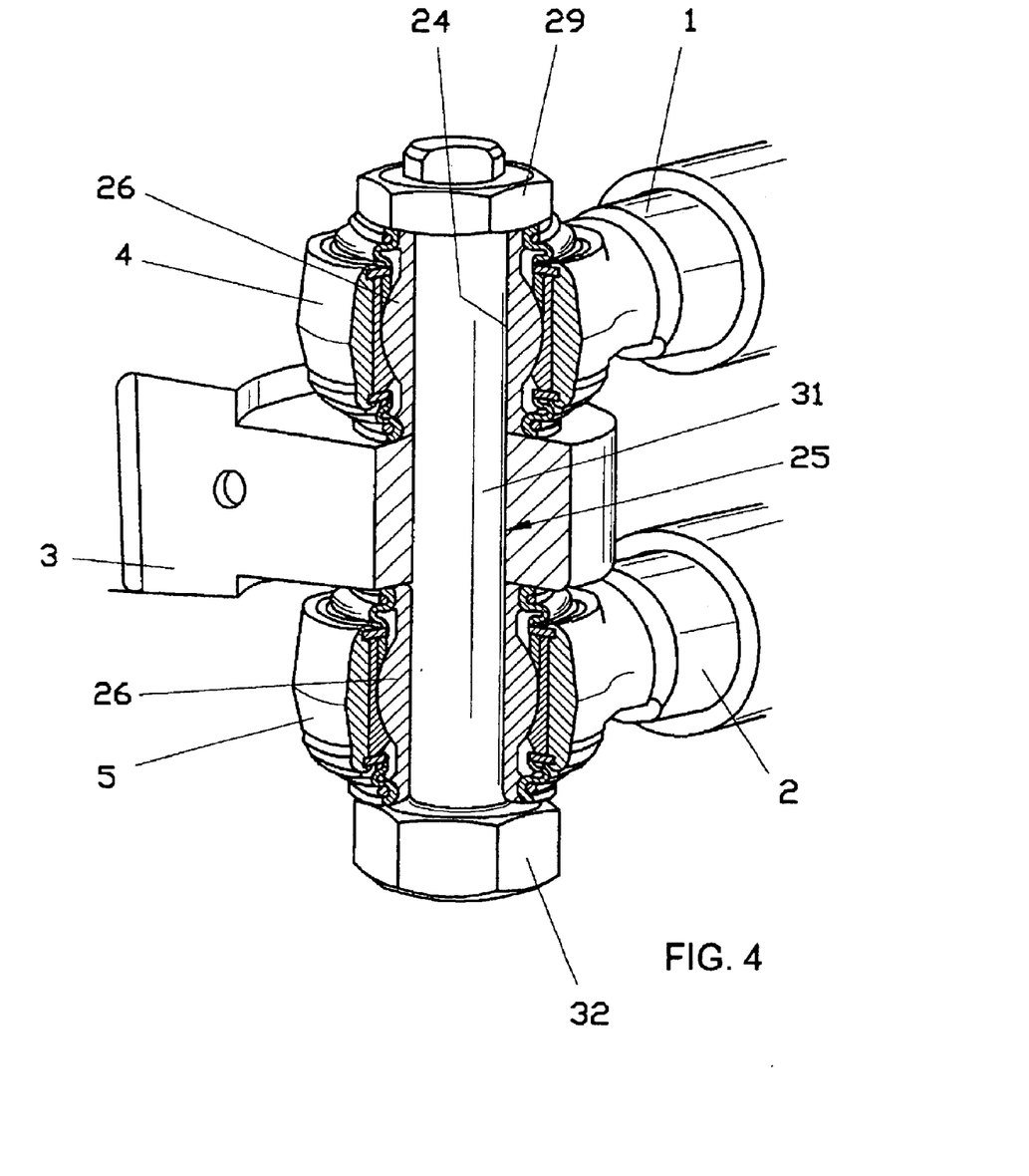
FIG. 4 is a perspective partially sectional view through the two-joint arrangement similar to the second solution variant.
Figure 5:
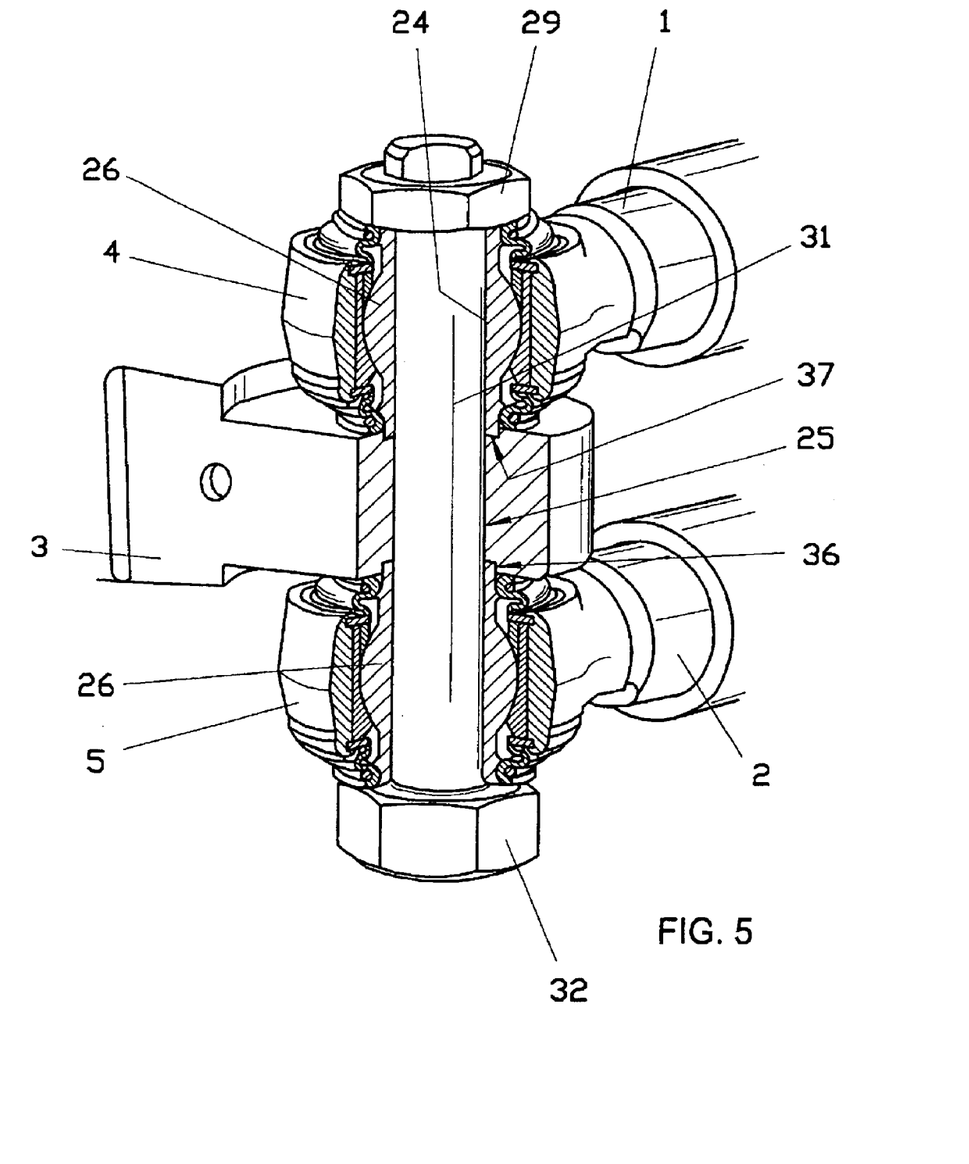
FIG. 5 is a perspective partially sectional view through the two-joint arrangement similar to the second solution variant.

In addition, for certain applications, it may be advantageous if the recess 25, as shown in FIGS. 4 and 5, is designed as a cylindrical through hole within the articulated part 3. Due to this measure, the screw bolt 31 may have a cylindrical design with a uniform diameter over its entire length, such that especially the use of a conventional hexagon head cap screw is also possible.

All components accommodated by the screw bolt 31, particularly the ball-and-socket joints 4, 5 and the articulated part 3, are tightened between the head area 32 of the screw bolt 31 and the clamping nut 29 screwed onto the opposite free end of the screw bolt 31.

In this embodiment variant, in order to prevent an, even though slight, lateral shift of the ball-and-socket joints 4 and 5 in relation to the articulated part 3, it may be advantageous according to FIG. 5 to arrange a cavity 36 or 37, which is greater in diameter than the recess 25, in the articulated part 3 in the opening areas for the through hole 25. The pivot part 26 of the said ball-and-socketjoints 4 and 5 meshes with these cavities 36 and 37, whereby the cavity has a diameter, such that a lateral shifting or slipping between the corresponding, meshing parts is not possible, which is especially advantageous in case of heavy loads against only the tightening of the components according to the view of FIG. 4.

As an alternative to providing the cavities 36, 37, it may also be provided for preventing the relative movements between the pivot parts 26 and the articulated part 3 that the pivot part is secured in the immediate contact area at the articulated part 3 by means of an adhesive layer.

In addition, as an alternative, a knurled section that also prevents a relative movement between the ball-and-socket joints 4, 5 and the articulated part 3 may be arranged in the area of the areas that are adjacent to the openings of the recess 25 on the upper side and lower side of the articulated part.

Figure 6:
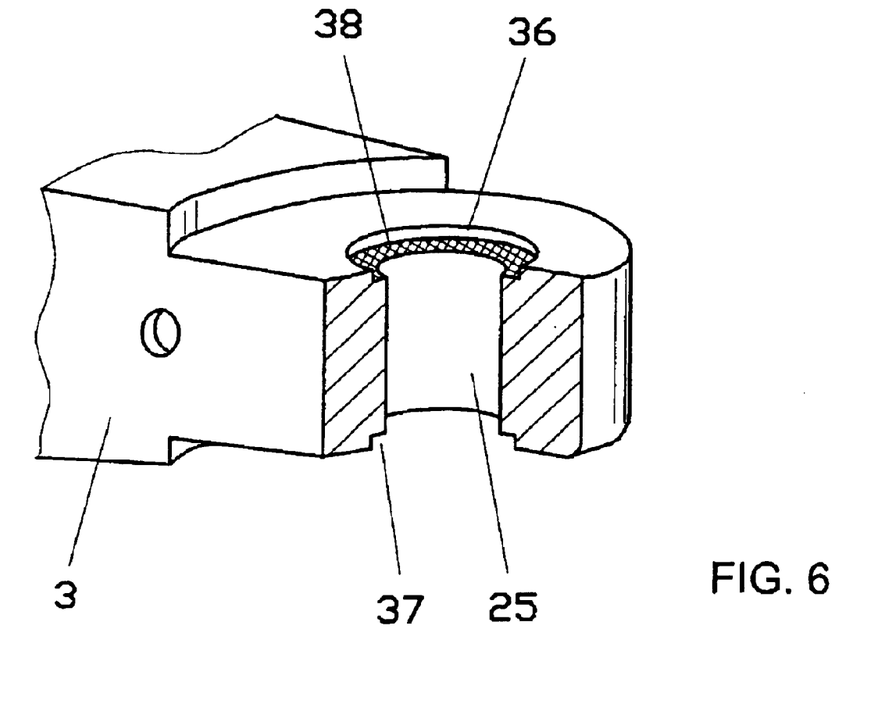
FIG. 6 is a perspective partially sectional view through the articulated part of the two-joint arrangement for securing in position on the car body side.

Such a knurled section may, as the view of FIG. 6 makes apparent once again, of course, also be arranged at the bottom of the cavities 36 and 37. Here, the knurled section 38 especially prevents a rotation of the pivot parts 26, which are arranged within the cavities 36 and 37, in relation to the articulated part 3.

Of course, the embodiment variants described for the prevention of relative movements between the articulated part 3 and the ball-and-socket joints 4 and 5 may also be used in different combinations, in which, e.g., the pivot parts 26 are bonded within the cavities 36 and 37

While specific embodiments of the invention have been shown and described in detail to illustrated the application of the principles of the invention, it will be understood that the invention may be embodied otherwise without departing from such principles.

What is claimed is:

1. A two-joint arrangement for the articulated connection of guide elements of a motor vehicle steering linkage with a common articulated part, the two-joint arrangement comprising:

a joint housing for each joint, each joint housing being connected to a corresponding guide element;

a bearing shell accommodated within each said joint housing;

a pivot part of one of said joints and a pivot part of another of said joints rigidly connected to said common articulated part, each said pivot part being accommodated in a rotatable and pivotable manner, said pivot part of one of said joints having an opening running in a pivot part axis direction having a screw bolt area with said screw bolt area penetrating said opening and having a surface portion abutting a surface of said common articulated part; and a clamping nut arranged on a free end of said screw bolt area facing away from said pivot part of said other joint.

2. A two-joint arrangement in accordance with claim 1, wherein:

said pivot part of said another joint has an intermediate area having a cone-shaped form between a bearing area contained in said bearing shell and said screw bolt area, with said intermediate area contained in a corresponding cone-shaped recess of said articulated part.

3. A two-joint arrangement in accordance with claim 2, wherein:

said pivot part of said other joint has a tool mount on its free end facing said bearing area for blocking rotary movement of said pivot part about its longitudinal axis.

4. Two-joint arrangement in accordance with claim 3, wherein:

said tool mount comprises a screw slot recess.

5. A two-joint arrangement for the articulated connection of guide elements preferably of a motor vehicle steering linkage with a common articulated part, the two-joint arrangement comprising:

a first joint housing for connected to a first guide element;

a second joint housing connected to a second guide element;

a first bearing shell accommodated within said first joint housing;

a second bearing shell accommodated within said second joint housing;

a first pivot part rigidly connected to said common articulated part, said first pivot part being accommodated in a rotatable and pivotable manner in said first bearing shell, wherein said first pivot part comprising a first ball sleeve part having an opening running in a pivot part axis direction;

a second pivot part rigidly connected to said common articulated part, said second pivot part being accommodated in a rotatable and pivotable manner in said second bearing shell, said second pivot part comprising a second ball sleeve part having an opening running in a pivot part axis direction;

a screw bolt provided with a widened head area said screw bolt penetrating said opening of said first pivot part and penetrating said opening of said second pivot part and passing through a recess of said common articulated part; and a detachable clamping nut, said screw bolt having a free end facing away from a head area that has said detachable clamping nut connected thereto.

6. A two-joint arrangement in accordance with claim 5, wherein:

said screw bolt in an area of said pivot part opening has a thread-free partial area which has a slightly smaller external diameter than said respective pivot part opening.

7. A two-joint arrangement in accordance with claim 1, wherein:

said opening of each said pivot part is designed as a through hole.

8. A two-joint arrangement in accordance with claim 6, wherein:

said screw bolt has an area having a cone-shaped form between said thread free partial area accommodated in said openings of said pivot parts and said recess of said articulated part is a corresponding cone-shaped recess, which cone-shaped area is accommodated in said corresponding cone-shaped recess of said articulated part.

9. A two-joint arrangement in accordance with claim 5, wherein:

said screw bolt which penetrates a recess in said articulated part has a uniform cylindrical area extending over its entire length.

10. A two-joint arrangement in accordance with claim 8, wherein:

said recess within said articulated part has at least one cavity in an end area of said recess, said cavity being directed outwards, in which at least one of said respective pivot parts of said joints are accommodated.

11. A two-joint arrangement in accordance with claim 10, wherein:

bottom areas of said cavity have a surface knurled section.

12. A two-joint arrangement in accordance with claim 5, wherein:

areas of said articulated part adjacent to said pivot parts have a surface knurled section.

13. A two-joint arrangement in accordance with claim 2, wherein:

said opening of each said pivot part is designed as a through hole.

14. A two-joint arrangement in accordance with claim 5, wherein:

said opening of each said pivot part is designed as a through hole.

15. A two-joint arrangement in accordance with claim 6, wherein:

said opening of each said pivot part is designed as a through hole.

16. A two-joint arrangement in accordance with claim 7, wherein:

said screw bolt has an area having a cone-shaped form between said thread free partial area accommodated in said openings of said pivot parts and said recess of said articulated part is a corresponding cone-shaped recess, which cone-shaped area is accommodated in corresponding cone-shaped recess of said articulated part.

17. A two-joint arrangement in accordance with claim 6, wherein:

said screw bolt which penetrates a recess in said articulated part has a uniform cylindrical area extending over its entire length.

18. A two-joint arrangement in accordance with claim 7, wherein:

said screw bolt which penetrates a recess in said articulated part has a uniform cylindrical area extending over its entire length.

19. A two-joint arrangement in accordance with claim 6, wherein:

areas of said articulated part adjacent to said pivot parts have a surface knurled section.

20. A two-joint arrangement, comprising:

a common articulated part having a cylindrical through hole;

a first joint housing connected to a first guide element;

a second joint housing connected to a second guide element;

a first bearing shell accommodated within said first joint housing;

a second bearing shell accommodated within said second joint housing;

a first pivot part rigidly connected to said common articulated part, said first pivot part being accommodated in a rotatable and pivotable manner in said first bearing shell, wherein said first pivot part comprises a first ball pivot part having an opening running in a pivot part axis direction, having a screw bolt area with said screw bolt area defined by a surface in said opening, and having a common part engagement surface extending around said opening of said first ball pivot part;

a second pivot part rigidly connected to said common articulated part, said second pivot part being accommodated in rotatable and pivotable manner in said second bearing shell, said second pivot part comprising a second ball pivot part having an opening running in a pivot part axis direction, having a screw bolt area defined by a surface in said opening, and having a common part engagement surface extending around said opening of said first ball pivot part;

a screw bolt with a portion extending into said opening of said first ball pivot part, with a portion extending into said opening of said second ball pivot part and with a cylindrical portion passing through said cylindrical through hole of said common articulated part.

21. A two-joint arrangement in accordance with claim 20, wherein:

a first area of said common articulated part in engagement with said first ball pivot part has a surface knurled section and a second area of said common articulated part in engagement with said second ball pivot part has a surface knurled section.

22. A two-joint arrangement, comprising:

a motor vehicle steering linkage common articulated part having a cylindrical through bole and with a first ball pivot part engagement area around said through hole with a second ball pivot part engagement area around said through hole;

a first joint housing connected to a first guide element;

a second joint housing connected to a second guide element;

a first bearing shell accommodated within said first joint housing;

a second bearing shell accommodated within said second joint housing;

a first ball pivot sleeve part having a ball portion accommodated in a rotatable and pivotable manner in said first bearing shell, a sleeve opening with a cylindrical surface extending in a pivot part axis direction, a common part engagement surface in contact with said first ball pivot part engagement area and extending in a direction substantially perpendicular to said pivot part axis direction in a region surrounding said opening of said first ball pivot part and a nut engagement surface extending in a direction substantially perpendicular to said pivot part axis direction in another region surrounding said opening of said first ball pivot part;

a second ball pivot sleeve part having a ball portion accommodated in a rotatable and pivotable manner in said second bearing shell, a sleeve opening with a cylindrical surface extending in a pivot part axis direction, a common part engagement surface in contact with said second ball pivot part engagement area and extending in a direction substantially perpendicular to said pivot part axis direction in a region surrounding said opening of said second ball pivot part and a bolt engagement surface extending in a direction substantially perpendicular to said pivot part axis direction in another region surrounding said opening of said second ball pivot part;

a cylindrical screw bolt having a substantially constant diameter over a length thereof and passing through each of said opening of said first ball pivot sleeve part, said opening of said second ball pivot sleeve part and said cylindrical through hole; and a detachable clamping nut, connected to a free end of said screw bolt.

23. A two-joint arrangement in accordance with claim 22, wherein:

one or more of said first ball pivot part engagement area, said second ball pivot part engagement area, said common part engagement surface of said first ball pivot sleeve part and said common part engagement surface of said second ball pivot sleeve part has a surface knurled section.

* * * * *